US012503635B2

(12) United States Patent
Amer et al.

(10) Patent No.: US 12,503,635 B2
(45) Date of Patent: Dec. 23, 2025

(54) CONTROL OF LOST CIRCULATION THROUGH A THERMALLY ACTIVATED METALLIC ADDITIVE

(71) Applicants: Newpark Drilling Fluids LLC, The Woodlands, TX (US); Board of Regents, The University of Texas System, Austin, TX (US)

(72) Inventors: Ahmed Said Amer, Katy, TX (US); Eric van Oort, Bee Cave, TX (US)

(73) Assignees: Newpark Drilling Fluids LLC, The Woodlands, TX (US); Board of Regents, The University of Texas System, Austin, TX (US)

(*) Notice: Subject to any disclaimer, the term of this patent is extended or adjusted under 35 U.S.C. 154(b) by 0 days.

(21) Appl. No.: 18/032,217

(22) PCT Filed: Oct. 19, 2021

(86) PCT No.: PCT/US2021/055662
§ 371 (c)(1),
(2) Date: Apr. 17, 2023

(87) PCT Pub. No.: WO2022/087002
PCT Pub. Date: Apr. 28, 2022

(65) Prior Publication Data
US 2024/0059957 A1    Feb. 22, 2024

Related U.S. Application Data

(60) Provisional application No. 63/094,504, filed on Oct. 21, 2020.

(51) Int. Cl.
*C09K 8/516*    (2006.01)
(52) U.S. Cl.
CPC .................................. *C09K 8/516* (2013.01)

(58) Field of Classification Search
CPC . C09K 8/03; C09K 8/032; C09K 8/42; C09K 8/426; C09K 8/428; C09K 8/50; C09K 8/516; E21B 21/00; E21B 21/003
See application file for complete search history.

(56) References Cited

U.S. PATENT DOCUMENTS 3,190,355 A * 6/1965 Clement ............... E21B 33/138
166/313
4,030,549 A * 6/1977 Bouck .................... F24T 10/20
165/45

(Continued)

FOREIGN PATENT DOCUMENTS

SU            1133380 A      1/1985

OTHER PUBLICATIONS

Wikipedia, Rose's metal, retrieved Mar. 20, 2024 from https://en.wikipedia.org/wiki/Rose%27s_metal (Year: 2024).*

(Continued)

*Primary Examiner* — Angela M DiTrani Leff
(74) *Attorney, Agent, or Firm* — Patrick Traister; Traister LLC (57) ABSTRACT

Compositions for treating a wellbore include an exothermic additive capable of initiating an exothermic event following contact with a carrier fluid. The exothermic additive can have a coating that delays the exothermic event after contact with the carrier fluid. Methods disclosed herein include emplacing a fluid loss treatment composition in an interval of a wellbore, the fluid loss treatment including: a metallic fluid loss additive; an exothermic additive; and a carrier fluid; and reacting the exothermic additive to initiate an increase in temperature in the interval of the wellbore above a melting point of the metallic fluid loss additive; and converting the metallic fluid loss additive to a molten fluid (Continued)

loss additive; and treating the interval of the wellbore with the molten fluid loss additive.

20 Claims, 4 Drawing Sheets

(56) References Cited

U.S. PATENT DOCUMENTS

| | | | | |
|---|---|---|---|---|
| 6,923,263 | B2* | 8/2005 | Eden | C09K 8/42 |
| | | | | 166/179 |
| 11,506,014 | B1* | 11/2022 | Zhang | E21B 36/008 |
| 2005/0269085 | A1* | 12/2005 | Cowan | E21B 21/003 |
| | | | | 166/276 |
| 2006/0037750 | A1* | 2/2006 | Wardlaw | E21B 29/10 |
| | | | | 166/277 |
| 2006/0144591 | A1* | 7/2006 | Gonzalez | E21B 29/10 |
| | | | | 166/57 |
| 2014/0262249 | A1 | 9/2014 | Willberg et al. | |
| 2016/0153273 | A1 | 6/2016 | Nguyen et al. | |

OTHER PUBLICATIONS

International Search Report and Written Opinion, PCT/US2021/055662, Jan. 27, 20222.

* cited by examiner

CONTROL OF LOST CIRCULATION THROUGH A THERMALLY ACTIVATED METALLIC ADDITIVE

BACKGROUND OF THE DISCLOSURE

Oil and gas exploration takes place in a variety of different subterranean environments and geological formations. A wellbore can pass through several geological regions having different geo-mechanical properties. As a result, a single well can have distinct intervals of varying strength and susceptibility to fracturing. One measure of formation strength in these intervals is the fracture gradient. For example, the fracture gradient in weakened or poorly consolidated zones is generally lower than surrounding zones, leading to small differences between the pore pressure and fracture pressure gradient along the length of a borehole. In order to access deeper reservoirs, it can be inevitable to drill through these weakened zones.

Fluid loss can occur when the fluid pressure in the wellbore is sufficient to either re-open existing fractures or create new fractures. As fractures open during operations such as drilling, cementing, completions, and the like, wellbore fluids are lost to the formation through these fractures. Loss of fluid to the formation is a problem, not only because of the replacement costs of the lost fluids, but also because of non-productive time (NPT) spent diagnosing and addressing fluid loss problems. NPT can substantially increase the capital cost of the oil and gas well. NPT can range from $1.0 MM/day to $1.5 MM/day on an offshore drilling platform, but can also result in significant expense on less expensive land-based well operations. It is estimated that the lost circulation causes several billions of dollars of NPT annually for oil and gas well operators.

When fluid loss is encountered, for decades the typical industry response, has been to pump a large variety of materials downhole to help bridge and plug the fractures. However, current fluid loss treatments are ineffective, difficult to employ, and involve the use of expensive chemicals and tools. The end result is poorly mitigated fluid loss that can proceed through untreated leak paths that progressively worsen during continued open hole time. A need exists for a system that can be used to treat fluid loss and/or strengthen wellbores, particularly, for cost-effective treatments that can be employed without the need for expensive chemicals or specialized equipment.

DETAILED DESCRIPTION

Provided herein are compositions and methods useful in remediating fluid loss. The present methods and compositions can also strengthen and consolidate formations. The present fluid loss treatments include a metallic fluid loss additive that is activated by heating. Fluid loss treatments can also include an exothermic additive that generates heat, activating the metallic fluid loss additive within a wellbore or wellbore interval to be treated. Upon heating, the metallic fluid loss additive transitions to a molten state and invades regions of the formation experiencing fluid loss. As the metallic fluid loss additive cools to ambient downhole temperature (and below the melting point of the metallic fluid loss additive), the metallic fluid loss additive transitions from a molten state to solid, forming a metal seal within the treated region.

In an aspect, the metallic fluid loss additive used to formulate fluid loss treatments can create a step-change in lost circulation control by sealing structures responsible for fluid loss, including fracture systems and unconsolidated formation intervals. The metallic fluid loss additive can include metals and metal alloys having a low melting point, such as 100° C., that are circulated downhole in solid form (e.g., as particulates, granules, or flakes suspended in a wellbore fluid), and converted by heating to a molten form. As the metallic fluid loss additive invades fractures and small cracks in molten form, the material cools and returns to solid form, creating a metallic seal inside the fracture that bonds and contours to the formation to stop further losses.

In an aspect, the metallic fluid loss additives can be delivered downhole as a combined treatment with one or more exothermic additives formulated to react within a target interval, initiating an exothermic reaction that heats the interval to a target temperature, such as above the melting temperature of the metallic fluid loss additive. With particular respect to FIG. 1, a schematic is shown depicting the delivery of a fluid loss treatment containing a metallic fluid loss additive 14 and an exothermic additive 16 to a target interval of a wellbore 10 having a plurality of fractures 12. Upon entry to the wellbore 10, the exothermic additive 16 initiates an exothermic reaction that heats the surrounding wellbore fluid.

Figure 1:
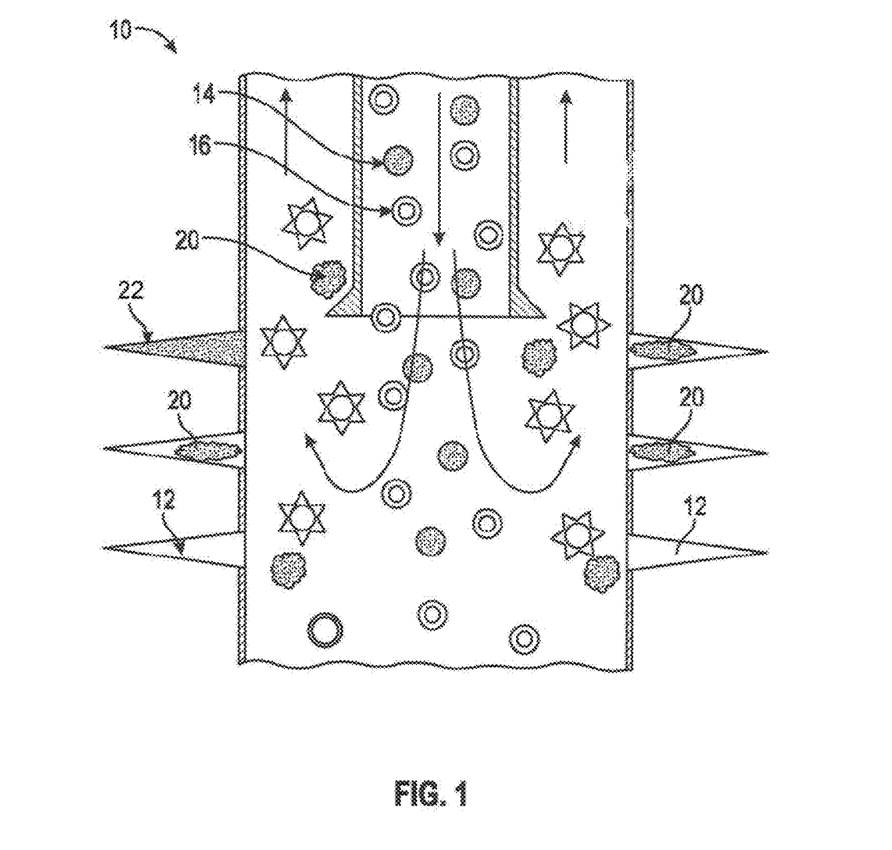
FIG. 1 is a schematic showing the deployment of a fluid loss additive composition in accordance with the present disclosure.

In an aspect, the exothermic additive 16 can have at least two components: (a) a payload 24 containing at least one compound or active material that causes an exothermic reaction, such as one or more hygroscopic salts, neutralization reactants, hydrolysis reactants, cascade reactants, and the like; and (b) one or more coatings 26 surrounding the payload 24 that prevent or limit contact of the payload 24 with surrounding fluids until the exothermic additive 16 has reached a target interval in the wellbore 10.

Figure 2:
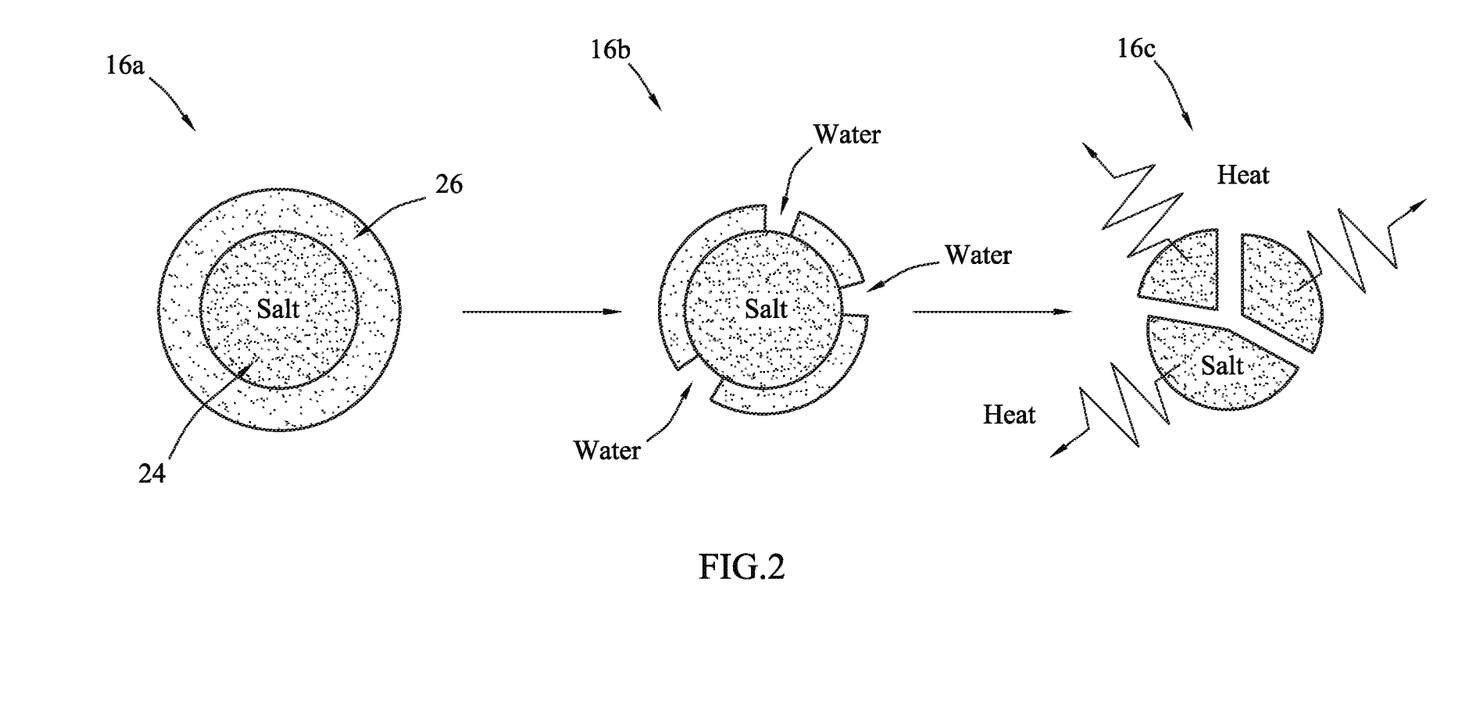
FIG. 2 is a schematic showing the activation of an exothermic additive in accordance with the present disclosure.

An example of the activation of the exothermic additive 16 is shown in FIG. 2. In this example, the exothermic additive 16a includes the payload 24 that is encapsulated within a coating 26 to prevent activation of the payload 24 prior to emplacement. As the coating 26 degrades, the payload 24 of the exothermic additive 16b is exposed to surrounding fluids, such as water, activating the payload 24 and initiating the exothermic reaction. The exothermic reaction of the payload 24 from the exothermic additive 16c generates substantial heat that is released into the surroundings.

The payload 24 is released according to a time- or stimuli-based mechanism to ensure that the exothermic reaction occurs at the target interval in the wellbore 10 at a time that is dependent on the chemistry of the coating 26. With respect to FIG. 3, a graphical comparison of the heat generation as a function of time is shown. A first line 30 illustrates heat generation as a function of time for an uncoated payload 24. A second line 32 or 34 illustrates heat generation as a function of time for the exothermic additive 16 having a reactive coating 26. In the present system design, the exothermic additive 16 is combined with a carrier fluid and emplaced by injecting for a pump time 36 that corresponds to a target interval depth of the wellbore 10. To generate the first line 30, the payload 24 is combined with a carrier fluid and injected into the wellbore 10 for the pump time 36. Upon contact with the carrier fluid, the payload 24 begins reacting immediately, discharging heat into the surrounding fluid and formation in wellbore 10. As pumping continues, the heat released by the payload 24 dissipates and the temperature returns to the baseline temperature of the carrier fluid.

Figure 3:
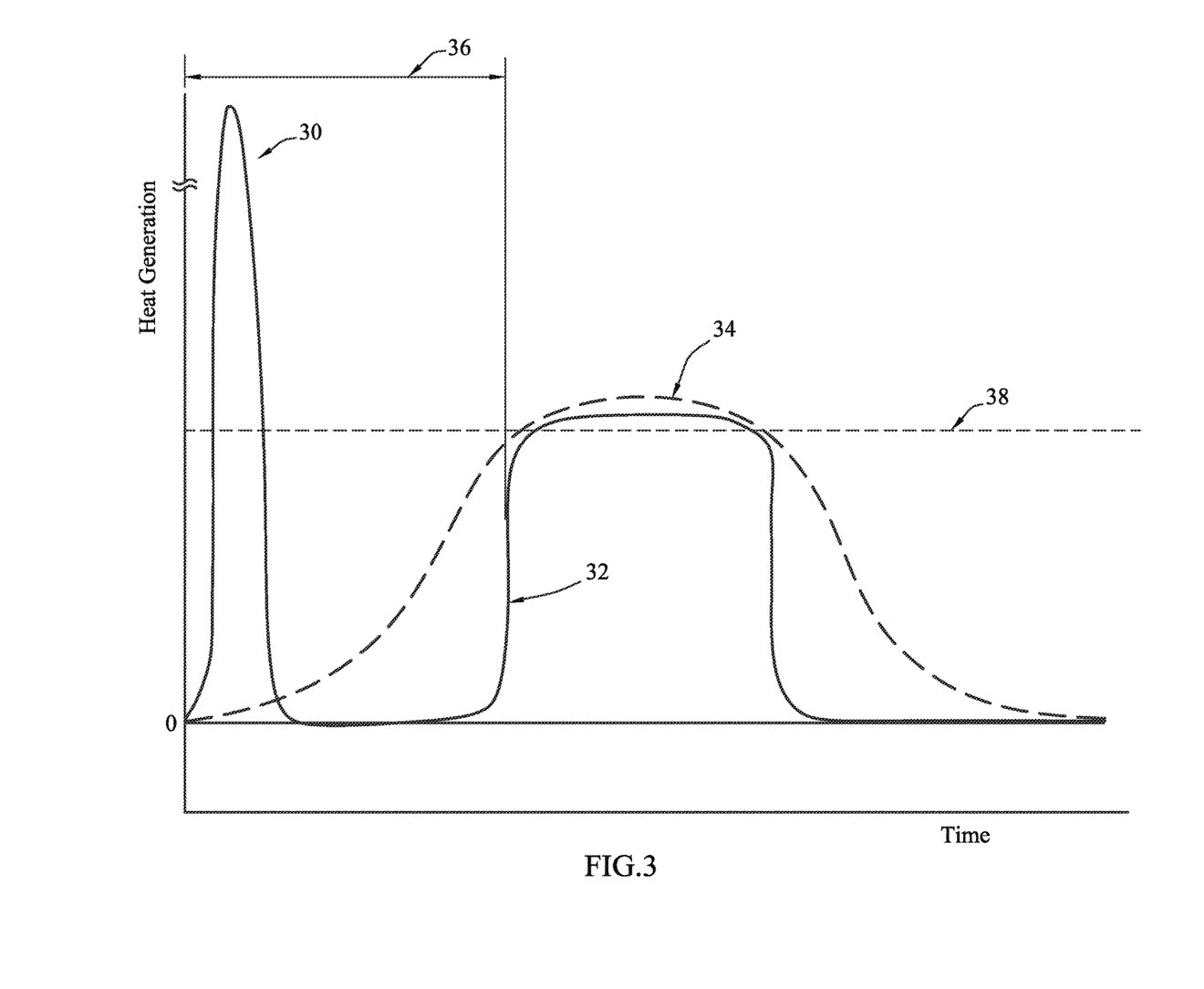
FIG. 3 is a graphical depiction showing the heat generation as a function of time for an exothermic additive in accordance with the present disclosure.

In the next case shown by the third line 32, an idealized heat generation profile for a coated exothermic additive 16 is shown in which the exothermic additive 16 is combined with a carrier fluid and injected into a wellbore 10 for pump time 36. The coating 26 of the exothermic additive 16 prevents reaction during pump time 36, at which point the coating 26 exposes payload 24 and the exothermic reaction initiates, raising the temperature to a target temperature 38. The target temperature 38 can be modified by a number of mechanisms, such as tuning the chemistry and/or size and surface area of the exothermic additive, tuning the heat capacity of the carrier fluid, and the like. As the reaction initiated by the exothermic additive 16 proceeds to completion, the heat dissipates and the temperature returns to the baseline temperature of the carrier fluid.

In second line 34, a heat generation profile for a coated exothermic additive based on actual test results is shown. The result is similar to the idealized case shown by third line 32, with the exception that there is some exothermic activity as a percentage of exothermic reaction occurs prior to emplacement in the target interval of wellbore 10, such as from the natural variation in the quality of coating 26 of the exothermic additive 16. Following delivery of the exothermic additive 16 to the target interval of wellbore 10 after the pump time 36, the exothermic reaction initiates fully, raising the temperature to target temperature 38. After the interval reaches target temperature 38, a tail in heat generation is created as a remaining fraction of exothermic additives 16 continues to react until completion. Following reaction completion, the heat dissipates and the temperature returns to the baseline temperature of the carrier fluid. While the examples shown in FIG. 3 are shown as the delivery of a single treatment or pill, it is also envisioned that, in an aspect, fluid loss treatments containing the exothermic additive 16 can be continuously injected until the target temperature is reached.

Returning to FIG. 1, as the exothermic additive 16 activates, the heat generated increases the temperature in the target interval of wellbore 10 to a target temperature that is dependent on the chemistry of the exothermic additive 16, the carrier fluid, the ambient temperature of the wellbore 10, and the like. In an aspect, the target temperature is based on the melting point of the metallic fluid loss additive 14. Upon reaching the target temperature, the metallic fluid loss additive 14 converts molten metallic fluid loss additive 18. Molten metallic fluid loss additive 18 then accumulates and deposits into one or more formation fractures 12 and generates one or more metal seals 20. Metal seal 20 reduces or eliminates fluid access to fracture networks and unconsolidated formation intervals, increasing the fracture gradient and improving zonal isolation. Following fluid loss treatment, subsequent wellbore operations can be performed such as completions and production.

In an aspect, fluid loss treatments in accordance with the present disclosure can be used in combination with any wellbore fluid composition, including drilling, cementing, and completion fluids, and for any wellbore application where fluid losses can be encountered. For example, fluid loss treatments can be employed in wells having narrow drilling margins, such as in land wells in fractured or unconsolidated formations and deepwater wells. A narrow drilling margin describes a well in which the difference between the fracture gradient and the higher of the pore pressure or mud pressure required for wellbore stability. Narrow drilling margins can lead to mud losses either during drilling, cementing, and/or completing the well. Fluid losses in turn can lead to increased down time, cost overruns, and well construction issues, such as poor zonal isolation due to cement loss while cementing narrow annuli casing/liner strings in the wellbore.

In an aspect, fluid loss treatments can be applied at various stages of wellbore operation, including drilling, casing, treating, cementing, work-over, and the like. Fluid loss treatments can be used to strengthen weak zones of the wellbore, such as depleted zones in sand formations. Well strengthening mechanisms can include reducing fracture formation and re-opening, reducing circulation loss, achieving cement lift, and completing or remediating zonal isolation.

Fluid loss treatments can improve wellbore strength by increasing the fracture gradient required to induce fractures in a formation at a given depth. In an aspect, the fracture gradient in a treated wellbore or interval can be increased by a pressure value of at least about 50 psi, 100 psi, 200 psi, 300 psi, 400 psi, 500 psi, 600 psi, 700 psi, 800 psi, 900 psi, or 1,000 psi. In an aspect, the fracture gradient in a treated interval can be increased by a pressure value in a range of 50 psi to 1,000 psi, 50 psi to 700 psi, or 50 psi to 500 psi.

In an aspect, the fracture gradient of a treated wellbore 10 or interval can be increased by a percentage of the pre-existing fracture gradient of at least about 5%, 10%, 15%, 20%, 25%, 30%, 35%, 40%, 45%, 50%, 55%, 60%, 65%, 70%, 75%, 80%, 85%, 90%, 95% or 100%. In an aspect, the fracture gradient of a treated wellbore 10 or interval can be increased by a percentage of the pre-existing fracture gradient by a value in the range of 5% to 100%, 5% to 75%, or 5% to 50%.

Metallic Fluid Loss Additive

Fluid loss treatments in accordance with the present disclosure can include any number of the metallic fluid loss additives 14. The metallic fluid loss additives 14 can be a single metal or an alloy of two or more metals, including eutectic alloys. In an aspect, the metallic fluid loss additives 14 exhibit a melting point, equivalently melting temperature or $T_m$, as determined by ASTM B774 in which the material transitions from solid to liquid as temperature increases past the melting point, and transitions from liquid to solid as the temperature falls below the melting point. In an aspect, the metallic fluid loss additives 14 can transition from liquid to solid without entering a gel phase. For alloys, the melting point is dependent on factors such as the concentration of the constituent metals, which provides a degree of tunability to raise or lower the melting point of the alloy depending on the particular application.

In an aspect, the metallic fluid loss additives 14 include metals and alloys having a suitable melting point for wellbore operations, i.e., a melting point that is above the temperature within the wellbore 10 or wellbore interval being treated and low enough to convert the solid material to a molten phase upon activation of the exothermic additive 16 in the fluid loss treatment. In an aspect, the metallic fluid loss additives 14 undergo a transition upon heating above the melting point in which the material reduces in viscosity, which enables penetration into the formation and conformation to irregularities located downhole, including sites capable of or experiencing fluid loss. Reduced viscosity also permits melted metal compositions to pass through narrow passages, such as sand screens, perforated holes, or microannuli in cement. The metallic fluid loss additives 14 in molten form do not mix with other fluids, as compared to cements and other sealing materials. Consequently, common sources of sealing defects such as channeling can be avoided or reduced.

The metallic fluid loss additives 14 can include metals and alloys selected from one or more of bismuth, gallium, indium, lead, tin, cadmium, antimony, germanium, copper, silver, and the like. In an aspect, the metallic fluid loss additives 14 can include bismuth metal and alloys. Bismuth has a low melting point relative to other metals, and alloy formulations with bismuth can provide tunability of the melting point. As an example, the metallic fluid loss additives 14 containing bismuth alloys can have a melting point within a range of 47° C. to 270° C.

In an aspect, the metallic fluid loss additives 14 can include bismuth and bismuth alloys that exhibit expansion as the material transitions from liquid to solid. For example, bismuth metal expands 1% to 3.5% on solidification. Expansion of the metallic fluid loss additives 14 can enable the material to conform to its surroundings and within fracture networks and unconsolidated formations. Bismuth also has low toxicity for a heavy metal and is also resistant to corrosion by common oxidants such as $H_2S$ or $CO_2$, so seals and plugs created by bismuth metal and alloys are durable over the typical life span of a well.

The metallic fluid loss additives 14 can have increased specific gravity compared to other components in a fluid loss treatment, and when emplaced within a wellbore 10 gravity carries the material to areas experiencing fluid loss, and the material displaces the wellbore fluid and conforms to void. As an example, bismuth metal has a specific gravity of 10 and, due to its density, metal and alloys containing bismuth settle by gravity, reducing the need for pumping and squeezing into position. Upon solidification, the metallic fluid loss additives 14 containing bismuth can expand approximately 1% to 3%, similar to the expansion of water upon freezing. Alloys containing more bismuth tend to expand during solidification and those containing less tend to remain constant in size or shrink during solidification. In an aspect, expansion can generate a radial load against the completion or open hole, anchoring a metallic seal in the well and blocking the flow of fluids and gasses.

In an aspect, the metallic fluid loss additives 14 can include a bismuth alloys having bismuth as a percent by weight (wt %) of the alloy of at least 5 wt %, 10 wt %, 20 wt %, 25 wt %, 50 wt %, 75 wt %, or 99 wt %. In an aspect, the metallic fluid loss additives 14 include a bismuth alloy having bismuth as a percent by weight (wt %) of the alloy in a range of 5 wt % to 99 wt %, 10 wt % to 99 wt %, or 25 wt % to 99 wt %.

Bismuth alloys compatible with fluid loss treatments in accordance with the present disclosure are described, for example, in U.S. Pat. No. 7,290,609 and U.S. Pat. Pub. 2015/0368542. Additional alloys suitable for use as the metallic fluid loss additives 14 are described in U.S. Pat. No. 7,152,657; U.S. Pat. Pub. 2006/0144591; U.S. Pat. Pub. 2005/0109511; and U.S. Pat. Nos. 6,828,531; 6,664,522; and 6,474,414.

The metallic fluid loss additives 14 can be formulated as solid pellets or other convenient shapes. As an example, the metallic fluid loss additives 14 can include particles that are substantially spherical in shape that are characterized by an average particle size (d50). In an aspect, the metallic fluid loss additives 14 can have an average particle size (d50) of at least 1 µm, 5 µm, 10 µm, 50 µm, or 100 µm. In an aspect, the metallic fluid loss additives 14 can have an average particle size (d50) in a range of 1 µm to 1 mm, 10 µm to 1 mm, or 10 µm to 100 µm. In an aspect, particle size and surface area of the metallic fluid loss additives 14 can be used to control melt times as the material reaches the respective melt temperature.

In an aspect, the metallic fluid loss additives 14 exhibit a melting point as determined by ASTM B774 of at least 47° C. 60° C., 75° C., 100° C., 130° C. 150° C., 170° C. 200° C., 230° C., 250° C. 270° C., or 300° C. In an aspect, the metallic fluid loss additives 14 can exhibit a melting point as determined by ASTM B774 selected from a value in a range of 95° C. to 300° C., 95° C. to 270° C., or 100° C. to 250° C.

In an aspect, the metallic fluid loss additives 14 can be selected based on the expected temperature of the wellbore 10 or target interval, such that the melting point of the metallic fluid loss additive 14 is above the ambient wellbore 10 temperature. In an aspect, the metallic fluid loss additives 14 can have a melting point as determined by ASTM B774 that is greater than the formation temperature by at least 10° C., 15° C., 20° C., 30° C., 50° C., 70° C., 90° C., and 100° C. In an aspect, the metallic fluid loss additives 14 can have a melting point as determined by ASTM B774 that is greater than the formation temperature by a value in a range of 10° C. to 100° C., 20° C. to 100° C., or 50° C. to 100° C.

Exothermic Additives

Fluid loss treatments in accordance with the present disclosure can include any number of exothermic additives 16 that react to generate heat within a wellbore 10 or wellbore interval. In an aspect, the exothermic additives 16 can have at least two components: (a) a payload 24 containing at least one compound or active material that causes an exothermic event, such as the generation of heat by solvation/hydration or through a multi-component reaction, and (b) one or more coatings 26 surrounding the payload 24 that prevent or limit contact of the payload 24 with surrounding fluids, such as a wellbore fluid or carrier fluid, until the composition has reached a target zone in the wellbore 10. Examples of the exothermic additives 16 are described in U.S. Pat. Pub. 2019/0145223.

Exothermic Additive Payload

The exothermic additive 16 can include a payload 24 capable of generating an exothermic event upon exposure to various fluids, including wellbore fluids. Exothermic events can be generated by several classes of chemical reaction, including exothermic dissolutions, neutralization reactions, hydrolysis reactions, and cascade reactions. In an aspect, payloads can be formulated from one or more compounds that generate exothermic events, including mixtures from different reaction classes (e.g., a payload can be formulated with a compound capable of exothermic dissolution and a compound capable of a hydrolysis reaction). Compounds suitable for formulation as payloads are described in greater detail in the following sections.

Exothermic Dissolutions

In an aspect, exothermic additives can include a payload that generates an exothermic event through exothermic dissolution. An exothermic dissolution occurs when a solute is combined with a solvent, for instance when a solid compound (or mixture) is contacted with a wellbore fluid. Compounds that undergo an exothermic dissolution can have a large enthalpy of dissolution and release heat/thermal energy upon solvation. Exemplary compounds that undergo exothermic dissolutions include salts and hygroscopic salts such as alkaline salt (i.e., containing Group I cations) or alkaline earth salt (i.e., containing Group II cations), including calcium salts, magnesium salts, potassium salts, and the like. Salts that undergo exothermic dissolution can also include hydrates of any of the above salts capable of generating heat upon further solvation. In an aspect, one or more salts that undergo exothermic dissolution can be formulated as a payload for an exothermic additive. In an aspect, the exothermic additives 16 can include salts such as $CaCl_2$, $MgCl_2$, $AlCl_3$, $CaBr_2$, $MgBr_2$, $K_4P_2O_7$, and the like, and hydrates thereof.

Exothermic Reactions

In an aspect, the exothermic additives 16 can include a payload that generates an exothermic event through exothermic reactions, including neutralization reactions and hydrolysis reactions, and combination thereof. Neutralization reactions include reactions between an acid and a base, such as between a reactive acid and a reactive base. As used herein, a reactive acid is a strong acid, i.e., an acid that completely ionizes in water. Exemplary reactive acids include mineral acids such as HCl, HBr, HI, HF, $HNO_3$, $H_2SO_4$, and $H_3PO_4$. As used herein, a reactive base is a strong base, i.e., a base that completely ionizes in water. Exemplary reactive bases include alkaline and alkaline earth hydroxides such as NaOH, LiOH, KOH, $Ca(OH)_2$, and $Mg(OH)_2$.

Hydrolysis reactions are those in which a compound reacts with water, wherein at least one oxygen-hydrogen bond in a water molecule is broken. As used herein, the term hydrolysis is distinguished from dissolution in that in a dissolution process water does not undergo formal oxygen-hydrogen bond breaking. Exemplary compounds that undergo a hydrolysis reaction include metal halides and sulfates such as $ZnCl_2$, $ZnBr_2$, $ZnI_2$, $Zn(SO_4)_2$, $AlCl_3$, $AlBr_3$, $AlI_3$ and $Al(SO_4)_2$, or pyrophosphates such as $K_4P_2O_7$, or phosphorous pentoxide ($P_2O_5$ and/or $P_4O_{10}$). In an aspect, the compound that undergoes a hydrolysis reaction can be a metal oxide, for instance the metal hydroxide form of NaOH.

In an aspect, the exothermic reaction can include a cascade reaction in which two or more compounds are concurrently delivered as a payload 24. Cascade reactions are complex reactions in which multiple compounds are delivered and react with downhole fluids such as water, or react with other compounds in the payload. In an aspect, a cascade reaction can include a hydrolysis reaction followed by a neutralization reaction in which each reaction contributes to the overall exothermic event. As an example, a cascade reaction payload can include a combination of $ZnCl_2$ and NaOH. Once emplaced and released from the coating 26 surrounding the exothermic additive 16, $ZnCl_2$ in the payload 24 reacts with water to generate zinc oxides/hydroxides and HCl. The generated HCl then reacts with NaOH base in a neutralization reaction.

In an aspect, payload 24 can include a combination of reactants capable of participating in a cascade reaction, including a hydrolysis reaction followed by a neutralization reaction, exothermic dissolution followed by a neutralization reaction, neutralization followed by exothermic dissolution, and the like. Cascade reactions can include any of the reactants selected from the above reaction discussions and/ or from one or more hydroxides, including LiOH, NaOH, KOH, $Ca(OH)_2$, $Sr(OH)_2$, and the like; fluorides, including KF, RbF, CsF, $MgF_2$, $AlF_3$, and the like; chlorides, including LiCl, $MgCl_2$, $CaCl_2$, $SrCl_2$, $AlCl_3$, and the like; bromides, including LiBr, NaBr, $MgBr_2$, $CaBr_2$, $SrBr_2$, $AlBr_3$, and the like; iodides, including, LiI, NaI, $MgI_2$, $CaI_2$, $SrI_2$, $AlI_3$, and the like; carbonates, including $Li_2CO_3$, $Na_2CO_3$, $K_2CO_3$, $MgCO_3$, $CaCO_3$, $SrCO_3$, and the like; nitrates, including $LiNO_3$, $Mg(NO_3)_2$, $Ca(NO_3)_2$, and the like; sulfates, including $Li_2SO_4$, $Na_2SO_4$, $MgSO_4$, $CaSO_4$, $SrSO_4$, $Al_2(SO_4)_3$, and the like; phosphates or pyrophosphates, including $K_4P_2O_7$, $Na_4P_2O_7$, $P_2O_5/P_4O_{10}$, and the like; or organic salts, including acetates such as $NH_4C_2H_3O_2$, $CH_3COONa$, and the like.

The exothermic additives 16 in accordance with the present disclosure can contain an exothermic compound in a solid form, including powders, granular, pellets, beads, pastilles or flakes. When the payload 24 includes two or more compounds, compounds can be mixed together to make a homogenous blend.

In an aspect, a payload 24 can be compressed into a tablet prior to coating with one or more coatings 26. Tablets can be prepared from payload solids, such as powders or flakes, using a tablet press or other suitable method. Tablet design can be used to control the overall rate of reaction by increasing or decreasing the surface area of the payload 24 accessible to surrounding fluids, which can be used to tune the amount of heat released and the duration of heat release. In an aspect, tablets can have a diameter of less than about 10 mm, 7.5 mm, 5.0 mm, 4.0 mm, 3.0 mm, 2.0 mm, or 1.0 mm. In an aspect, tablets can have a diameter from about 0.25 mm to 10 mm, 0.25 to 7.5 mm, 0.25 to 5.0 mm, 0.25 to 4.0 mm, 1.5 to 4.0 mm, 2.0 mm to 4.0 mm, or 3.0 mm to 4.0 mm. Tablets can be prepared using a pressure of at least about 500 psi, 750 psi, 1000 psi, 1250 psi, 1500 psi, 1750 psi, or 2000 psi, 3000 psi using a hold time of 1 to 100 seconds, 1 to 50 seconds, 5 to 50 seconds, 10 to 50 seconds, 25 to 50 seconds, or 25 to 35 seconds. The resulting tablets can have a hardness from 1 to 50 kp, 2.5 to 40 kp, 5 to 30 kp, 5 to 10 kp, 5 to 15 kp, 10 to 20 kp, or 20 to 30 kp.

Exothermic Additive Coatings

In an aspect, the exothermic additives 16 can contain one or more coatings 26 that delay activation of the payload 24 and enables delivery of exothermic reactants at a target location in the wellbore 10 at a controllable time. The exothermic additives 16 can include the coating 26 that degrades when exposed to an activation trigger, such as the passage of time, changes in temperature or pH; degradation of the coating 26 by enzymes, oxidants, or solvents; pressure change; or physical disruption of the coating 26, such as by grinding or crushing.

In an aspect, the exothermic additives 16 can be prepared by encapsulating the payload 24, such as a powder or tablet, with one or more coatings 26. In an aspect, the payload 24 can be encapsulated within the coating 26, which can then be further coated with various coating techniques. A plurality of coated payload particles can then be encapsulated or agglomerated in a second coating. The coating 26 can contain multiple layers, for instance either of the same or different polymers. In an aspect, the coating 26 can include separate layers surrounding each payload 24. In an aspect, the coating 26 can include multiple payloads 24 (each encapsulated within at least one polymer layer) that are agglomerated within a polymer matrix.

If the exothermic additives 16 contain multiple coatings, for example, the respective coatings can be the same or different. In an aspect, the exothermic additives 16 containing two or more payload 24 compounds (for instance, for a cascade reaction), the payload 24 can be formulated in a variety of ways, including admixing two or more compounds together and then encapsulating the admixture in the coating 26; or encapsulating two or more compounds separately and then agglomerating the compounds together with or without an additional coating 26. In an aspect, embodiments, the payload 24 can be coated with a first coating layer 26a. A plurality of coated payload particles can then be encapsulated or agglomerated in a second coating layer 26b.

Figure 4:
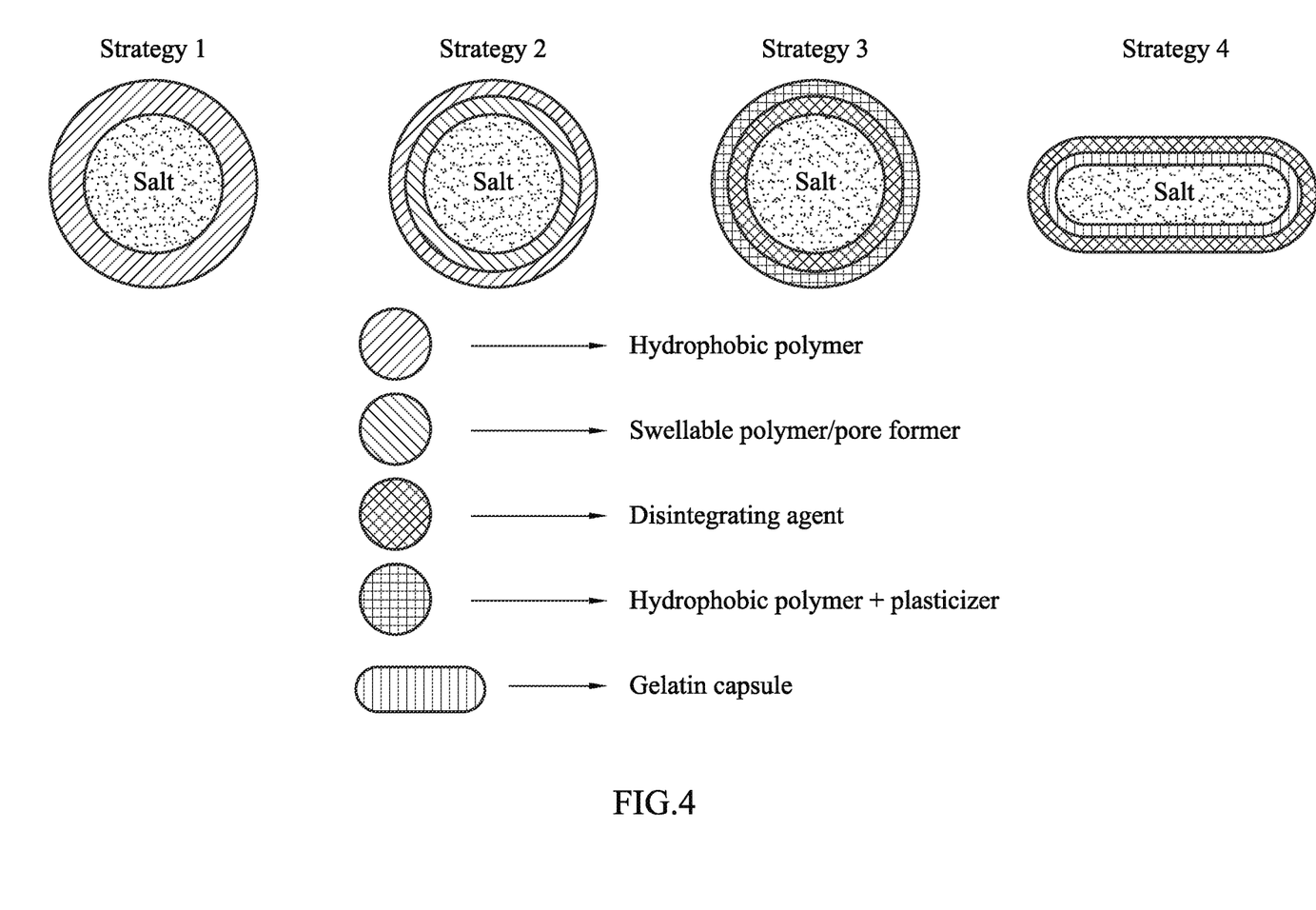
FIG. 4 is a schematic showing various configurations for exothermic additives in accordance with the present disclosure.

With particular respect to FIG. 4, several strategies of encapsulating the payload 24 to produce the exothermic additives 16 are shown. In FIG. 4, strategy 1 depicts coating a payload 24, an exothermic salt in this case, with a hydrophobic polymer to prevent or minimize activation of the payload 24 prior to emplacement in a target interval of wellbore 10. Strategy 2 depicts an exothermic additive 16 prepared by coating a payload 24 with a first layer of swellable or pore-forming polymer, followed by an outer coat of hydrophobic polymer. Strategy 3 depicts an exothermic additive 16 prepared by coating a payload 24 with a disintegrating agent, followed by an outer coat of hydrophobic polymer and plasticizer. Strategy 4 depicts an exothermic additive 16 prepared by coating a payload 24 with a gelatin capsule, followed by an outer coat of hydrophobic polymer and plasticizer. While a number of possible strategies are shown, it is understood that other variations are possible and it is envisioned that any coating 26 (or coatings) capable of delayed release of a payload 24 within a wellbore 10 or carrier fluid can be applicable to the activation of the metallic fluid loss additives 14 in accordance with the present disclosure.

In an aspect, the exothermic additives 16 can include the coating 26 formulated such that the payload 24 is not released for at least about 0.10 hours, 0.20 hours, 0.25 hour, 0.30 hours, 0.5 hour, 0.75 hour, 1 hour, 1.5 hours, 2.0 hours, 2.5 hours, 3.0 hours, 3.5 hours, 4.0 hours, 4.5 hours, or 5.0 hours after the composition is placed into contact with a carrier fluid, such as a wellbore fluid. In an aspect, the exothermic additives 16 can include the coating 26 formulated such that the payload 24 is not released for a time in in a range of 0.10 hours to 5 hours following contact with the carrier fluid.

Wax Coatings

In an aspect, the exothermic additives 16 can include the coating 26 formed by one or more wax coatings. In an aspect, the wax coating can be used as an inner coating layer, further covered by a different polymer. In an aspect, the wax coating is the only layer present in the coating. As the wax coating melts, the payload 24 is released into the wellbore 10. As different waxes have different melting points, selection of the appropriate wax coating permits a temperature-controlled release of the payload 24 at a specific target zone in the wellbore 10 (depth and temperature). In an aspect, the exothermic additives 16 can include a wax coating prepared from one or more waxes such as stearic acid cetostearyl alcohol, carnauba wax, cetyl esters wax, microcrystalline wax, cetomacrogol emulsifying wax, white beeswax, yellow beeswax, paraffin wax, candelilla wax, montan wax, Fischer-Tropsch wax, alpha olefin waxes, polyethylene wax, and the like.

Delayed Release Polymer Coatings

In an aspect, the exothermic additives 16 can include the coating 26 formed by a delayed release polymer. Suitable delayed release polymers can include water-insoluble polymers, or a mixture of water-insoluble and water-soluble polymers. Exemplary delayed release polymers include alkylcelluloses such as ethylcellulose; cellulose ethers, including hydroxyalkylcelluloses such as hydroxypropyl cellulose and hydroxypropylmethylcellulose; carboxyalkyl-celluloses such as carboxymethylcellulose, cellulose acetate, and cellulose acetate phthalate; shellac, waxes such as carnauba wax; and the like; and combinations thereof.

In an aspect, the coating 26 can contain a mixture of an alkyl cellulose with a hydroxyalkyl cellulose. In an aspect, the alkyl cellulose can be present at a percent by weight (wt %) of a polymer mixture in an amount within a range of 50 wt % to 99 wt %, 60 wt % to 95 wt %, 70 wt % to 90 wt %, or 80 wt % to 90 wt %. Exemplary combinations include ethyl cellulose and hydroxypropyl cellulose. By way of example, ethyl cellulose and hydroxypropyl cellulose can be blended in a ratio (w/w) from 50:50 to 99:1, for instance such as 70:30, 75:25, 80:20, 85:15, 90:10, or 95:5. In an aspect, ethyl cellulose and hydroxypropyl cellulose can be blended in a ratio from about 95:5 to 70:30, or 90:10 to 80:20.

In an aspect, the coating 26 can contain one or more layers of a mixture of delayed release polymers, such as mixtures of alkylcelluloses and hydroxyalkyl celluloses, as well as one or more layers of a hydroxyalkyl cellulose that is not blended with an alkylcellulose. For instance, the payload 24 can first be coated with a water swellable polymer, and then that composition can be coated with a blend of a hydrophobic polymer and water swellable polymer. In an aspect, the composition can include a blend of alkylcellulose and hydroxyalkyl cellulose coating a layer of hydroxyalkyl cellulose.

Enteric Release Polymers

In an aspect, the exothermic additives 16 can include the coating 26 formed by one or more enteric release polymers. Suitable enteric release polymers include acrylic and methacrylic acid polymers and copolymers, such as methyl methacrylate, methyl methacrylate copolymers, ethoxyethyl methacrylates, cyanoethyl methacrylate, aminoalkyl methacrylate copolymer, poly(acrylic acid), poly(methacrylic acid), methacrylic acid alkylamine copolymer, poly(methyl methacrylate), poly(methacrylic acid) (anhydride), polymethacrylate, polyacrylamide, poly(methacrylic acid anhydride), and glycidyl methacrylate copolymers.

In an aspect, the coating 26 can contain an enteric release polymer that does not release the payload 24 until the composition is exposed to a fluid having a pH of greater than about 4.0, 5.0, 6.0, 6.5, 7.0, 7.5, 8.0, 8.5, 9.5, 10.0, 10.5, 11.0, or 11.5. In an aspect, the coating 26 can include an inner layer of an enteric release polymer and an outer layer of another polymer type, such as a delayed release polymer. In an aspect, the coating 26 can include an inner layer of another polymer type, such as a delayed release polymer, and an outer layer of an enteric release polymer.

Pressure-Sensitive Coatings

In an aspect, the exothermic additives 16 can include the coating 26 that does not release a payload 24 until triggered by increased pressure at a targeted depth within a wellbore 10. In an aspect, pressure-sensitive coatings can include one or more hollow porous microspheres. Hollow microspheres can include, by way of example, glass, ceramic, metal, plastic, or mixtures thereof. In an aspect, an exothermic additive 16 can include a layer of hollow microspheres surrounding a payload 24, and a polymer layer surrounding the layer of microspheres. In an aspect, an exothermic additive 16 can include multiple payloads 24, each surrounded by a layer of hollow microspheres, that are agglomerated within a polymer matrix. In an aspect, an exothermic additive can include a coating 26 containing a mixture of hollow microspheres and polymer. The exothermic additives 16 can be formulated with a pressure-sensitive coating that releases a payload 24 as the surrounding pressure increases to a pressure of at least 100 psi, 200 psi, 300 psi, 400 psi, 500 psi, 600 psi, 700 psi, 800 psi, 900 psi, or 1000 psi.

Adjuncts

The exothermic additives 16 can include a payload 24 admixed with one or more selected from disintegrating agents, plasticizers, or combinations thereof. Disintegrating agents that modify the disintegration of the coating 26 can be added to the payload 24 to cause the coating 26 to crack faster once fluid ingresses from the exterior. Exemplary disintegrating agents include cellulosic polymers such as ethyl cellulose, microcrystalline cellulose, hydroxypropyl methylcellulose, carboxymethylcellulose; saturated and unsaturated fatty acids such as palmitate, stearate, linoleic acid, and the like; starch glycolates; polyvinylpyrrolidone and copolymers thereof (e.g., copovidone); and the like; and combinations thereof.

Disintegrating agents can be present at a percent by weight (wt %) of the exothermic additive 16 in an amount ranging from 1 wt % to 50 wt %, increased binder concentration corresponds to decreased active material to cause the exothermic event. In an aspect, a disintegrating agent can be present at a percent by weight (wt %) in a range of 1 wt % to 25 wt %, 1 wt % to 20 wt %, 2 wt % to 20 wt %, 5 wt % to 20 wt %, 5 wt % to 15 wt %, or 5 wt % to 10 wt %. In an aspect, lubricants can be present in an amount from 0.1 wt % to 1.0 wt % of the payload 24.

In an aspect, the exothermic additives 16 can have an average particle diameter of about 10 mm, about 9 mm, about 8 mm, about 7 mm, about 6 mm, about 5 mm, about 4 mm, about 3 mm, about 2 mm, or about 1 mm. In an aspect, the exothermic additives 16 can have an average particle diameter in the range of 1 mm to 10 mm. In an aspect, the exothermic additives 16 can contain a payload 24 at a percent by weight (wt %) of the exothermic additive that is at least 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 80 wt %, 85 wt %, 90 wt %, or 95 wt %. In an aspect, the exothermic additives 16 can contain a payload 24 at a percent by weight of the exothermic additive in the range of 5 wt % to 95 wt %, 30 wt % to 90 wt %, 45 wt % to 90 wt %, 50 wt % to 90 wt %, 60 wt % to 90 wt %, or 70 wt % to 90 wt %.

Coating Preparation

The exothermic additives 16 can be prepared by coating the payload 24 using various methods such as a pan coat tumbler, fluid bed, or other coating technology known in the art. Exemplary solvents include halogenated alkanes such as dichloromethane (DCM) and 1,1 dichloroethane, and alcohols such as anhydrous ethanol and isopropanol. In an aspect, the coating 26 can be prepared by encapsulating a payload 24 with a polymer solution, where the polymer solution can have a polymer (or polymers) concentration as a percent by weight (wt %) of solution in a range from about 0.5 wt % to 10 wt %, 0.5 wt % to 7.5 wt %, 1 wt % to 7.5 wt %, or 1 wt % to 5 wt %. In an aspect, a plasticizer can be incorporated into a polymer solution at a concentration as a percent by weight (wt %) of solution in the range of 0.1 wt % to 10 wt %, 0.3 wt % to 5.0 wt %, or 0.3 wt % to 3.0 wt %.

Carrier Fluids

In an aspect, fluid loss treatments can be formulated in a carrier fluid that provides a delivery vehicle for solids and other additives into a wellbore 10 and/or a target interval. Suitable carrier fluids include water-based fluids including fresh water, seawater, brines, and the like, oil-based fluids mineral oil, diesel oil, synthetic oil such as olefins, ester and synthetic paraffins, or combinations thereof, solvents include lower alcohols such as methanol, ethanol, isopropanol, isobutyl, n-propanol, ethylene glycol, propylene glycol, glycerol, glycerol/acetone suspensions, emulsions, including direct and invert emulsions, and mixtures thereof. The carrier fluid can further contain additional components, for instance surfactants, anti-flocculants, viscosity modifiers, fluid loss additives, weighting agents, buffers, lost circulation material, and buffer components.

Applications

Fluid loss treatments can include an exothermic additive 16 having a payload 24 capable of initiating an exothermic event following contact with a carrier fluid, and a coating 26 that delays contact between the payload 24 and the carrier fluid; and a metallic fluid loss additive 16 having a melting point as determined by ASTM B774 in a range of 47° C. to 270° C.

Fluid loss treatments can be delivered to the wellbore 10 by pumping the treatment from the drill pipe to the annular space between the drill pipe and the borehole, directly to the annulus between the drill pipe and the borehole, or, in case of cementing applications, into the annular space between the casing and the borehole. In an aspect, a fluid loss treatment can be circulated adjacent a location in the wellbore 10 by pumping it past—or injecting it into—the location. For example, a fluid loss treatment can be circulated adjacent the location in the formation from the surface and/or downhole by means of a tubing or a drill pipe.

Any suitable mechanism for pumping a fluid loss treatment can be utilized to circulate the fluid into the formation and/or target interval, such as techniques employed in hydraulic fracturing. In an aspect, wellbore fluid treatments can be circulated at a fluid density and circulation pressure below that required to initiate fractures in the formation. Fluid loss treatment components can be added to a carrier fluid by a hopper or alternative surface mixing device and then pumped through a drill pipe inside the borehole (conventional circulation), or through the annulus in direct contact with the formation (reverse circulation), or pumped through the casing into the annular space between the casing and the borehole. Heat can be released through thermal convection and/or conduction. In an aspect, greater control over the location of the exothermic event in the wellbore 10 can be achieved by proper selection of fluid direction.

In an aspect, methods disclosed herein include emplacing a fluid loss treatment composition in an interval of a wellbore 10, the fluid loss treatment including: a metallic fluid loss additive 14; an exothermic additive 16, and a carrier fluid; and reacting the exothermic additive to initiate an increase in temperature in the interval of the wellbore 10 above a melting point of the metallic fluid loss additive 14; and converting the metallic fluid loss additive 14 to a molten fluid loss additive; and treating the interval of the wellbore 10 with the molten fluid loss additive.

In an aspect, methods disclosed herein include determining a formation temperature for a target interval of a wellbore 10; formulating a fluid loss treatment comprising a metallic fluid loss additive 14 having a melting point as determined by ASTM B774 that is greater than the formation temperature by at least 10° C., and an exothermic additive 16; emplacing the fluid loss treatment composition in the target interval of the wellbore 10; and reacting the exothermic additive to initiate an increase in temperature in the target interval of the wellbore 10 above the melting point of the metallic fluid loss additive 14; converting the metallic fluid loss additive to a molten fluid loss additive; and treating the interval of the wellbore 10 with the molten fluid loss additive.

In an aspect, fluid loss treatments can be formulated as a fluid loss pill that is injected prior to or upon experience of fluid loss during a wellbore operation, such as drilling, cementing, fracturing, workover, and the like. Fluid loss treatments formulated as a pill can have a total volume of less than 200 bbl, 300 bbl, or 400 bbl.

In an aspect, fluid loss treatments can be continuously combined with the carrier fluid and pumped into the wellbore 10, thereby maintaining exothermic reactions for prolonged periods of time in the wellbore 10. In an aspect, the composition can be added to the wellbore 10 for a period of at least 0.15 hours, 0.25 hours, 0.5 hours, 0.75 hours, 1.0 hours, 1.25 hours, 1.5 hours, 1.75 hours, 2.0 hours, 2.25 hours, 2.50 hours, 2.75 hours, 3.0 hours, 3.25 hours, and 3.5 hours, 3.75 hours, 4.0 hours, 4.25 hours, 4.5 hours, 4.75 hours, or 5.0 hours. However, the treatment time can be more or less, depending on the particular application.

In an aspect, methods include increasing the temperature at a interval in a wellbore 10 by introducing a fluid loss treatment containing an exothermic additive 16 into the wellbore 10 or target interval in the wellbore 10, and initiating an exothermic event. In an aspect, an exothermic event can raise the temperature of fluid within a target interval of the wellbore 10 by at least 5° C., 10° C., 20° C., 30° C., 40° C., 50° C., 75° C., 100° C., 125° C., or 150° C. In an aspect, the exothermic additives 16 can increase the temperature within a target interval of wellbore 10 for a period of at least 5 minutes, 10 minutes, 30 minutes, 1 hour, 2 hours, 3 hours, 4 hours, at least 5 hours, or at least 6 hours. In an aspect, the temperature can be increased by at least about 5° C., 10° C. 20° C., or 50° C. for a period of time in a range of about 5 to 120 minutes, 30 to 120 minutes, 45 to 120 minutes, 60 to 120 minutes, or 60 to 90 minutes. In an aspect, the exothermic additives 16 can increase the temperature of rock formations within a target interval of wellbore 10, penetrating into the rock formation at a depth of at least about 0.25 cm, 0.5 cm, 0.75 cm, 1.0 cm, 1.25 cm, 1.50 cm, 1.75 cm, 2.0 cm, 2.5 cm, 3.0 cm, 3.5 cm, 4.0 cm, 4.5 cm, or 5.0 cm.

In an aspect, fluid loss compositions can have a weight ratio of the exothermic additive 16 to the metallic fluid loss additive 14 in a range of 10:1 to 1:1, 5:1 to 1:1; 5:1 to 1:5, or 1:1 to 1:5.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents can be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

We claim:

1. A composition for treating a wellbore, comprising:
a carrier fluid;
an exothermic additive in the carrier fluid, the exothermic additive comprising a payload having at least one compound or active material capable of initiating an exothermic event following contact with fluid surrounding the exothermic additive in the wellbore and a coating surrounding the payload, the coating being capable of delaying contact of the payload with fluid surrounding the exothermic additive in the wellbore; and
a metallic fluid loss additive in the carrier fluid, the metallic fluid loss additive having a melting point, the metallic fluid loss additive being capable of being converted to a molten fluid loss additive after the exothermic additive initiates a temperature increase above the melting point of the metallic fluid loss additive.

2. The composition of claim 1, wherein the composition is formulated as a fluid loss pill having a total volume of less than 200 bbl.

3. The composition of claim 1, wherein the metallic fluid loss additive comprises a bismuth metal.

4. The composition of claim 1, wherein the metallic fluid loss additive comprises a bismuth alloy.

5. The composition of claim 4, wherein the bismuth alloy comprises bismuth as a percent by weight (wt %) of the alloy in a range of 5 wt % to 99 wt %.

6. The composition of claim 1, wherein the metallic fluid loss additive has a melting point in a range of 47° C. to 270° C.

7. The composition of claim 1, wherein the metallic fluid loss additive has a melting point that is greater than a formation temperature within a formation to be treated by a value in a range of 10° C. to 100° C.

8. The composition of claim 1 wherein the weight ratio of the exothermic additive to the metallic fluid loss additive is in a range of 10:1 to 1:1.

9. The composition of claim 1, wherein the coating delays contact between the payload and the fluid surrounding the exothermic additive in the wellbore by a time within a range of 0.1 hours to 5 hours.

10. A method, comprising:
circulating a fluid loss treatment composition into an interval of a wellbore, the fluid loss treatment composition comprising a carrier fluid, a metallic fluid loss additive in the carrier fluid and an exothermic additive in the carrier fluid, the exothermic additive comprising a coating surrounding a payload, the payload comprising at least one compound or active material capable of initiating an increase in temperature in the interval of the wellbore following contact with fluid surrounding the exothermic additive in the wellbore after the coating delays the contact;

reacting the exothermic additive to initiate the increase in temperature in the interval of the wellbore above a melting point of the metallic fluid loss additive;

converting the metallic fluid loss additive to a molten fluid loss additive; and depositing the molten fluid loss additive into at least one fracture within the wellbore; and reducing or eliminating fluid access to the at least one fracture with the molten fluid loss additive.

11. The method of claim 10, wherein the fluid loss treatment composition is a fluid loss pill having a total volume of less than 200 bbl.

12. The method of claim 10, wherein the metallic fluid loss additive comprises bismuth metal.

13. The method of claim 10, wherein the metallic fluid loss additive comprises a bismuth alloy comprising bismuth as a percent by weight (wt %) of the alloy in a range of 5 wt % to 99 wt %.

14. The method of claim 10, wherein the method further comprises delaying reacting the exothermic additive until the fluid loss treatment composition is circulated into the interval.

15. A method, comprising:
determining a formation temperature for a target interval of a wellbore;
formulating a fluid loss treatment composition comprising a carrier fluid, a metallic fluid loss additive in the carrier fluid, the metallic fluid loss additive having a melting point that is greater than the formation temperature, and an exothermic additive in the carrier fluid, the exothermic additive comprising a coating surrounding a payload, the payload comprising at least one compound or active material capable of initiating an increase in temperature in the interval of the wellbore following contact with fluid surrounding the exothermic additive in the wellbore after the coating delays the contact;
circulating the fluid loss treatment composition into the target interval of the wellbore;
reacting the exothermic additive to initiate the increase in temperature in the target interval of the wellbore above the melting point of the metallic fluid loss additive;
converting the metallic fluid loss additive to a molten fluid loss additive;
creating a metallic seal inside the least one fracture from the molten fluid loss additive; and
preventing or eliminating fluid loss from the at least one fracture with the metallic seal.

16. The method of claim 15, wherein the metallic fluid loss additive comprises bismuth metal.

17. The method of claim 15, wherein the metallic fluid loss additive comprises a bismuth alloy comprising bismuth as a percent by weight (wt %) of the alloy in a range of 5 wt % to 99 wt %.

18. The method of claim 15, wherein the metallic fluid loss additive comprises a melting point that is greater than the formation temperature by a value in a range of 10° C. to 100° C.

19. The method of claim 15, wherein the method further comprises delaying reacting the exothermic additive until the fluid loss treatment composition is circulated into the target interval.

20. The method of claim 15, wherein the fluid loss treatment composition is a fluid loss pill having a total volume of less than 200 bbl.

* * * * *